June 4, 1935.  R. M. NARDONE  2,003,456
ENGINE STARTING APPARATUS
Filed Sept. 5, 1930  2 Sheets-Sheet 1
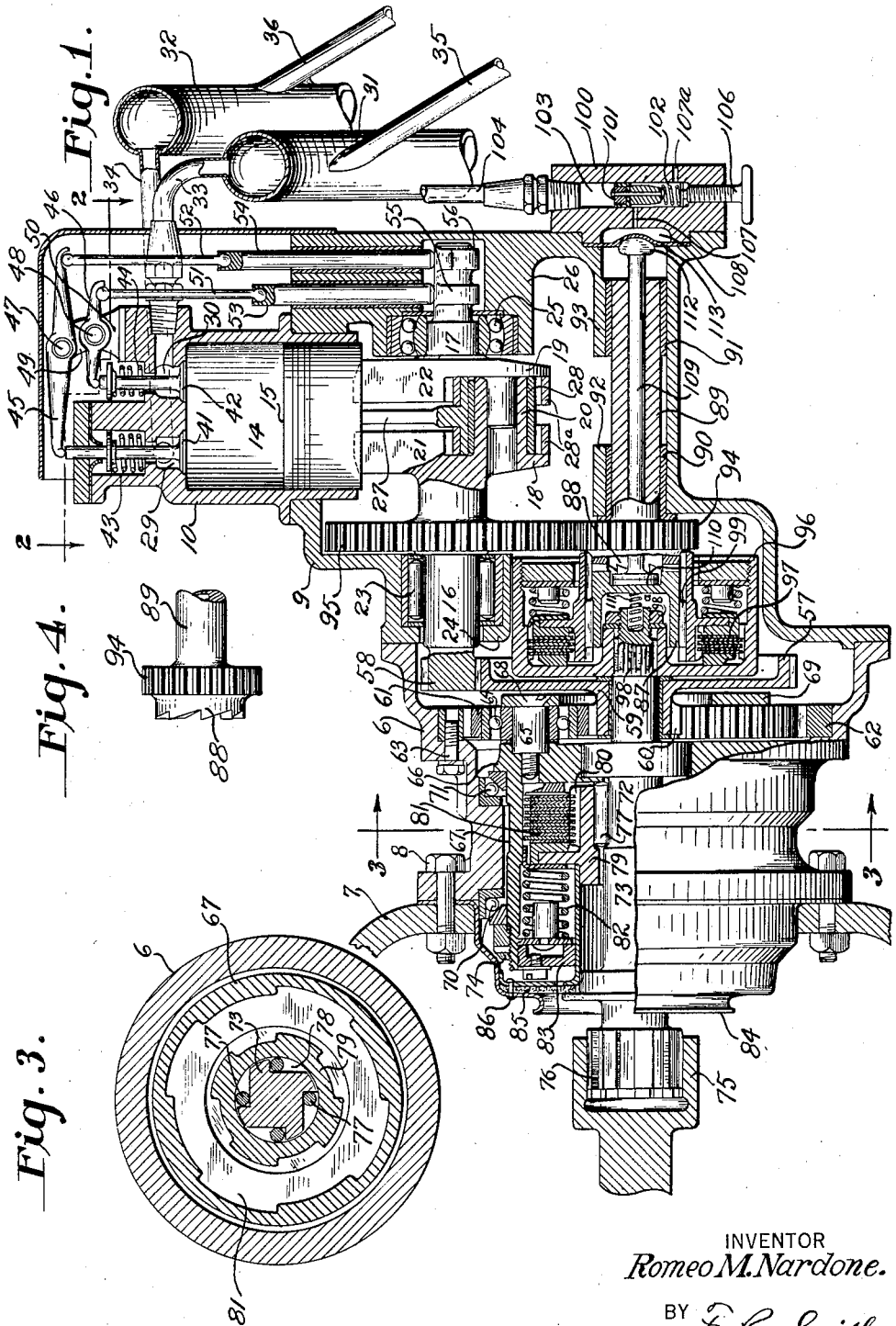
INVENTOR
Romeo M. Nardone.
BY F. B. Smith
ATTORNEY

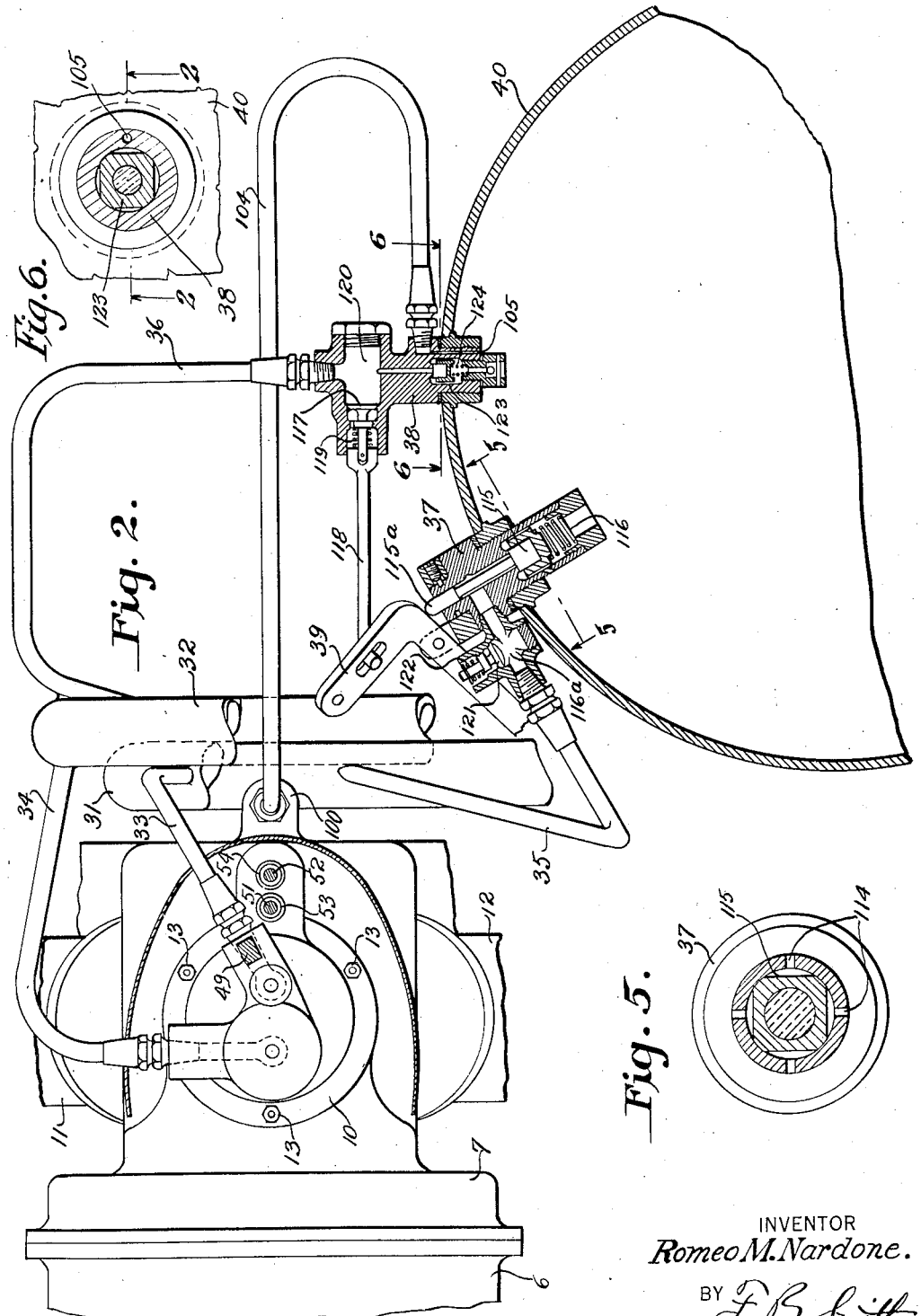

Patented June 4, 1935

2,003,456

UNITED STATES PATENT OFFICE 2,003,456

ENGINE STARTING APPARATUS

Romeo M. Nardone, East Orange, N. J., assignor to Eclipse Aviation Corporation, East Orange, N. J., a corporation of New Jersey Application September 5, 1930, Serial No. 480,014

4 Claims. (Cl. 60—18)

The present invention relates to engine starting apparatus for internal combustion engines.

One of the objects of the invention is to provide in a novel starting mechanism for internal combustion engines, the combination with a driving member adapted to crank an engine to be started and driving means therefor, of a source of energy for actuating said driving means, and means whereby said driving means may be operated as a generator of energy after the engine is started for replenishing said source when the latter is weakened.

Another object is to provide a novel engine starter embodying power means for cranking the engine to be started, said means being adapted to be operated as a generator by the engine after the latter is operating under its own power.

Another object is to provide an engine starter of the above type including a fluid pressure actuated motor and novel means whereby said motor may be operated as a compressor after the engine is started.

Another object is to provide in a fluid pressure actuated starter, the combination of a fluid pressure motor and novel transmission means adapted to transmit the energy from the motor to a member of the engine to be started for cranking the latter and whereby the motor may be operated as a compressor after the engine is started and operating under its own power.

Another object is to provide in combination with an engine starter of the fluid pressure type which is adapted to be operated as a compressor after the engine is started and a tank for storing the fluid under pressure, novel means whereby the operation of the starter as a compressor is automatically stopped when a predetermined pressure is reached in the tank.

A further object of the invention is to provide in combination with an engine starter of the above type embodying a fluid pressure actuated motor for cranking an engine to be started and a supply of fluid under pressure for actuating said motor, novel means whereby said motor may be operated as a compressor by said engine after the latter is started when the pressure of the fluid supply falls below a predetermined value.

Another object is to provide an engine starter of the above type embodying a fluid pressure motor for cranking an engine to be started and adapted to be operated as a fluid compressor after said engine is operating under its own power, in combination with a tank for storing the compressed fluid, and novel means whereby said fluid may be supplied to said motor from said tank for actuating the latter and whereby the compressed fluid may be stored in said tank after said motor is operating as a compressor.

Another object is to provide an engine starter of the above type in combination with a tank for storing a fluid under pressure, a novel distributing system whereby fluid may be taken from the tank for operating the fluid pressure motor and then exhausted and whereby fluid may be taken from an external source and supplied to the tank under pressure after said motor is operating as a compressor.

A further object is to provide in a fluid pressure system for an engine starter of the type embodying a fluid pressure engine, novel means adapted to function as intake and exhaust means for said fluid pressure engine when the latter is operating either as a motor to crank an internal combustion engine to be started or as a compressor after said internal combustion engine is operating under its own power, and means whereby said intake and exhaust means may be caused to function one way or the other.

A still further object of the invention is to provide a novel unitary structure embodying power actuated starting means for internal combustion engines, and means whereby said starting means may be operated as a generator of power after the engine is started.

Still another object is to provide novel engine starting mechanism that is reliable and efficient in operation, light, compact, and simple in structure, thereby facilitating assembly, maintenance and replacement of parts, and which provides its own reserve supply of energy, thereby eliminating auxiliary apparatus for the purpose.

The above and other objects and advantages of the invention will be apparent more fully hereinafter from a consideration of the detailed description which follows, together with the accompanying drawings, wherein is illustrated one embodiment of the invention. It is to be expressly understood, however, that the drawings are for the purpose of illustration only, and are not to be construed as a definition of the limits of the invention, reference being had for this purpose to the appended claims.

In the drawings, wherein like reference characters refer to like parts throughout the several views, Fig. 1 is a partial axial sectional view of one embodiment of the invention with parts broken away;

Fig. 2 is a schematic arrangement as viewed from line 2—2 in Fig. 1, illustrating one form of a fluid pressure distributing system which may be employed in accordance with the present invention, certain parts being shown in section;

Fig. 3 is a cross-sectional view taken on line 3—3 of Fig. 1, showing one form of a one-way drive which may be used;

Fig. 4 is a detail view of one form of engaging member which may be employed for operating the fluid pressure motor as a compressor upon a decrease in pressure of the fluid supply;

Fig. 5 is a cross-sectional view taken on line 5—5 of Fig. 2, illustrating a type of valve which may be employed in the distributing system; and Fig. 6 is a cross-sectional view taken on line 6—6 of Fig. 2, illustrating the control valve 38.

The embodiment of the present invention illustrated comprises an engine starter of the type having a driving member in engagement with a member of the engine to be started and which may be actuated by power means through a suitable train of reduction gearing and other drive transmission means including a one-way drive, said power means in the present instance comprising a fluid pressure engine adapted to be operated first as a motor to actuate said driving member for cranking the engine to be started, and then to be operated by said driving member as a compressor after the engine is started and operating under its own power.

In the form shown, the driving member, drive transmission means, and reduction gearing are suitably supported and housed within a substantially cylindrical casing section 6, which is detachably connected to the housing or crank case 7 of the engine to be started, by suitable means, such as bolts 8; while the power actuating means are in turn suitably housed in a casing section 9, which is detachably connected to casing 6 by any suitable means (not shown). Section 6 is open at its outer end in order to facilitate assembly and maintenance of the power actuating means, while section 9 forms a closure for the casing, a bearing for the crank shaft of the power actuating means and for the pressure actuated member which is adapted to engage the driving member for actuating the power means as a generator of energy.

The power actuating means preferably comprises a fluid pressure engine or motor, the crank shaft of which is drivably connected to the driving member of the starter through a suitable reduction gear train and other drive transmission means.

In the form shown, the power means preferably comprises a plurality of radially arranged cylinders 10, 11, and 12 secured by any suitable means, such as screws 13, to the outer casing section 9, the upper ends of the cylinders extending radially from said casing. There may be any suitable number of these cylinders, arranged singly or in pairs, but preferably three cylinders are employed, and spaced substantially 120 degrees apart. Each cylinder forms an expansion chamber 14, within which a piston 15 is reciprocated, said expansion chamber functioning as a compression chamber when the engine is operating as a compressor, in a manner to be described hereinafter.

Means are provided for reciprocating pistons 15 comprising a crank shaft which, in the form shown, is built up of two main elements, each of which comprises a shaft portion 16 and 17, crank pin portions 18 and 19 which are adapted to telescope one within the other to form a crank pin 20, and counterweight portions 21 and 22. Shaft portion 16 is suitably journaled, as by means of a roller bearing 23, supported in a boss 24 formed in the inner face of casing section 9, while shaft portion 17 is suitably journaled, as by means of a ball bearing 25, in a boss 26 formed integrally with casing section 9. Pistons 15 are provided with the usual piston rods 27, the latter being journaled on the crank pin 20 as by means of a bearing or bushing 28, and held thereon by suitable rings or collars 28a.

Suitable means are provided for supplying and exhausting a motive fluid to the above described fluid pressure engine, said means in the present embodiment comprising intake and exhaust ports 29 and 30 which are connected to intake and exhaust manifolds 31 and 32 in any suitable manner, as by means of pipes 33 and 34. Intake and exhaust manifolds 31 and 32 are suitably connected, as by means of pipes 35 and 36 (Fig. 2) and control valves 37 and 38 in said pipes, which may be actuated from the cockpit of an airplane, by means of a bell crank lever 39, to a source of fluid under pressure, such as a compressed air tank 40.

Intake and exhaust ports 29 and 30 are alternately opened and closed by means of valves 41 and 42 which are adapted to be actuated against the tension of springs 43 and 44, by means of the rocker arms 45 and 46, the latter being pivoted intermediate their ends, as indicated at 47 and 48, in suitable bosses 49 and 50 projecting from the head of the cylinder. Rocker arms 45 and 46 are in turn adapted to be actuated through links 51 and 52 and push rods 53 and 54 by means of cams 55 and 56, which may be rigidly attached or formed integrally with shaft portion 17 of the crank shaft and so arranged as to cause the exhaust valve to be open when the intake valve is closed, and vice versa. Cams 55 and 56 are positioned on shaft portion 17 so that, as the crank shaft rotates, each of the cylinders 10, 11, and 12 are connected in sequence to the intake and exhaust manifolds 31 and 32 in the usual manner.

Rotation of the crank shaft of the fluid pressure engine is transmitted to the driving or engine-engaging member by suitable means which preferably includes a train of reduction gearing and other drive transmission means. The reduction gearing in the embodiment shown comprises a large external gear 57 which meshes with and is driven by a pinion 58, which is shown merely by way of preference as integral with shaft portion 16 of the crank shaft. Formed integral with hub 59 of external gear 57 is a pinion or sun gear 60 which meshes with a plurality of planetary gears 61, preferably three in number, the planetary gears in turn engaging with a stationary internal ring gear 62 secured to the interior of casing section 6 in any suitable manner, as by means of screws 63. Planetary gears 61 are journaled on ball bearings 64 surrounding sleeves 65 which are countersunk in and mounted on the base 66 of a driving barrel 67 which forms a part of the drive transmission means, later to be described, by means of screws 68, and are held in proper operating position in the bearings thus formed by means of a retaining ring 69.

The drive transmission means, which includes driving barrel 67, is adapted to transmit the rotation of the fluid pressure engine crank shaft as received by said barrel through the reduction gearing to a driving or engine-engaging member which is adapted to crank a member of the engine to be started. In the form shown, driving barrel 67 is rotatably supported within casing section 6 by means of ball bearings 70 and 71 carried by said casing section. Driving barrel 67 is also journaled on a bearing member 72 carried by or formed integral with driving member or shaft 73. Longitudinal movement of the barrel is prevented by means of a nut 74 secured to the end thereof and which also serves to hold ball bearing 70 in position. Driving member or shaft 73 is secured to an engine member 75 at the end of the starter in any suitable manner, as by means of splines 76, and is rotatably supported in and drivably connected to driving barrel 67 by any suitable means, such as the before-mentioned bearing 72, and a one-way clutch which is somewhat diagrammatically illustrated and which may include rollers 77 positioned longitudinally of the driving member or shaft 73 in recesses 78 provided in said driving member as indicated in Fig. 3, and a sleeve member 79 having external splines 80 for a purpose to be described hereinafter.

In certain installations it may be desirable to provide yielding means intermediate the train of gearing described above and engine driving member 73 in order to protect the parts against an overload. For this purpose there is preferably employed a multiple disc clutch embodying a plurality of friction discs 81, a number of said discs being splined to the inner surface of the barrel 67 and the remainder being splined to the outer surface of the sleeve 79 by means of the splines 80, before mentioned. Resilient means, such as a plurality of coil springs 82 and an adjusting nut 83 which is threaded into the inner end of barrel 67, are provided for varying the pressure with which discs 81 are maintained in engagement.

The function of the one-way clutch is to enable the driving barrel to rotate the driving member 73 for cranking the engine member 75 and to permit driving member 73 to freely rotate within the barrel after the engine is started. This function is accomplished by the fact that when the barrel is rotated clockwise, as viewed in Fig. 3, sleeve member 79 is rotated therewith, and the rollers 77 are wedged against said sleeve member, causing a locking engagement between the latter and driving member 73.

After the engine has started operating under its own power, driving member 73 overruns the sleeve member 79, causing the rollers 77 to move into the larger portions of the recesses 78 so that they no longer are wedged against said sleeve member, and the driving member 73 is thereby permitted to rotate freely within said sleeve member without engaging the latter.

An oil-sealing member 84, suitably secured between the flanges of starter casing 6 and engine casing 7, surrounds driving member 73 and the inner end of the drive transmission means, to prevent oil from leaking from within engine casing 7 back into the starter mechanism, said member being provided with a washer 85 of leather or other suitable material and held in position by any suitable means, such as rivets 86.

It is desirable that a reserve supply of fluid under pressure be maintained at all times for operating the fluid pressure motor or engine, and to this end the invention provides means whereby said fluid pressure engine may be operated as a compressor by the engine being started after the latter is operating under its own power. In the form shown, said means comprises a driving clutch or sleeve member 87 which is adapted to be moved into and out of engagement with a corresponding clutch jaw 88, the latter being rigidly carried by or formed integral with a hollow shaft 89 suitably journaled, as by means of sleeve bearings 90 and 91 supported in bosses 92 and 93 formed integral with the casing section 9.

Also carried by the shaft 89 and rotatable therewith, is a pinion 94 which meshes with a large external gear 95 carried by the shaft portion 16 of the crank shaft of the fluid pressure engine. Rotation is imparted to the crank shaft through the external gear 95 and pinion 94 by means of a second driving barrel 96, which is provided with a disc clutch 97 similar to the disc clutch 81 described above, and which is drivably connected to the driving member or shaft 73 in any suitable manner, as by means of splines 98, and held thereon by suitable means such as nut 98a. Driving member 87 is slidably supported within barrel 96 in any suitable manner, as by means of splines 99. The splined engagement between the barrel 96 and the driving member 87 insures positive rotation of the latter with said barrel. From this construction it will be apparent that when the driving member 87 is in engagement with the clutch jaw 88, driving member or shaft 73, which is driven by the engine being started after the latter is operating under its own power, is adapted to actuate driving member 87 through the barrel 96 to cause rotation of the pinion 94 and hence the external gear 95, thereby rotating the crank shaft of the fluid pressure engine.

Rotation of the crank shaft causes reciprocation of the pistons 15 within their respective cylinders, thereby compressing a fluid in the chamber 14 which is admitted through the intake port 29 on the downward stroke of the pistons and exhausted after compression through the port 30 when the valve 42 is opened by the operation of the cam 56 and rocker arm 46.

It is desirable that the fluid pressure engine be operated as a compressor only at such times as when the pressure of the source of supply, as for example the tank 40, falls below the pressure required to operate said engine as a motor. To this end, novel means are provided for normally holding the driving clutch jaw member 87 out of engagement with the clutch jaw 88 when the pressure of the source of supply is sufficient to operate the pressure engine as a motor and for automatically permitting the driving clutch jaw 87 to engage clutch jaw 88 when said pressure falls below the required value. In the form shown, said means comprises a pressure actuated valve 100 detachably secured to the casing section by any suitable means (not shown).

Slidable within the valve body is a piston 101 which is adapted to be moved against the tension of a spring 102 by a fluid under pressure admitted into the chamber 103 and supplied thereto by any suitable means, such as a pipe 104, the latter being connected to the tank 40, from which said fluid is supplied, by suitable means, such as a bleeder port 105. An adjusting screw 106 is provided for varying the tension of the spring 102 whereby actuation of the piston 101 may be set for a predetermined pressure within the tank 40.

When the piston 101 is actuated so that it moves below the passage 107, the fluid under pressure will pass therethrough and into a chamber 108. This descent of piston 101 also cuts off the communication between chamber 108 and the atmosphere which theretofore existed by reason of vent 107a and the annular space around the lower end of the piston. Means are provided for utilizing the fluid pressure admitted into chamber 108 for maintaining driving clutch jaw 87 out of engagement with the clutch jaw 88 when said pressure is above a predetermined value, and in the present embodiment, said means comprises a rod 109 passing through and slidable within hollow shaft 89 and having a flange 110 on one end thereof adapted to fit within a circular recess formed within driving clutch jaw member 87 and adapted to hold the latter out of engagement with clutch jaw 88 against the tension of a spring 111 interposed between driving member 73 and driving clutch jaw 87. The other end of the rod 109 is provided with a preferably rounded or hemispherical head portion 112 which is adapted to bear against a flexible member 113, as, for example, a pressure diaphragm of any suitable material, which may be conveniently supported in any suitable manner as by clamping, between casing section 7 and the body of the valve 100.

It will be apparent that when the pressure within the tank 40 is sufficiently high to cause the piston 101 to be forcibly held in position below the passage 107 against spring 102, the fluid pressure transmitted therethrough will cause pressure diaphragm to move to the left, as viewed in Fig. 1, thereby causing the rod 109 to move driving clutch jaw 87 out of engagement with clutch jaw 88, and to be held out of engagement therewith as long as the pressure within the tank is above a predetermined value necessary to operate the fluid pressure engine as a motor. As soon as the pressure drops, spring 111 automatically moves driving clutch jaw 87 into engagement with clutch jaw 88, thereby causing rotation of the pinion 94 and gear 95 to actuate the pressure engine as a compressor, thus supplying compressed fluid to the tank until the predetermined pressure therein is again reached, at which time valve 100 functions to cause disengagement of the two clutch jaws.

Novel means are provided for controlling the operation of the starter to cause actuation of the pressure engine as a motor by admitting fluid thereto and for cutting off the supply of fluid after the engine to be started is operating under its own power and for simultaneously connecting the fluid pressure engine to the tank in such a manner that compressed fluid is supplied to the tank. In the form shown, said means comprises valves 37 and 38, hereinbefore mentioned, which are adapted to be simultaneously actuated by means of the bell crank lever 39 which may be conveniently operated as by means of a rod (not shown) leading to the cockpit of an airplane or the dashboard of an automobile. The valve 37 is connected to the intake manifold 31 by means of the pipe 35, while the valve 38 is connected to the exhaust manifold 32 by means of the pipe 36. The valve 37 is adapted to supply a fluid under pressure from the tank 40 to the fluid pressure engine when the latter is operating as a motor, such flow of fluid under pressure being by way of passage 116a and through pipe 35 and intake manifold 31. In order to establish communication between tank 40 of the passage 116a to effect such flow of fluid under pressure the piston 115 of valve 37 is moved downward by means of the bell crank lever 39. At the same time valve member 117 of valve 38 is opened by means of a link 118 connected to the bell crank lever 39 and movable therewith against the tension of a spring 119, thereby exhausting the fluid from the pressure engine through the exhaust manifold 32, pipe 36, and chamber 120 through valve 38 by means of valve member 117. At the time that bell crank lever 39 is held to the right, as viewed in Fig. 2, valve member 121 of valve 37 is held closed by the action of spring 122, while the piston 123 of valve 38 is held closed by the action of spring 124 and the pressure in the tank.

When the bell crank lever 39 is moved to the left after the internal combustion engine is started, piston 115 of valve 37 is moved upward by spring 116 to close passages 114, and valve member 117 of valve 38 is closed by means of the link 118 with the aid of the spring 119. The internal combustion engine is then operating under its own power, and if the pressure within the tank 40 has dropped below the predetermined value, the pressure engine will then be operated as a compressor through the agency of the driving member 73, clutch jaws 87 and 88, pinion 94, and gear 95, thereby creating a suction in the intake manifold 31, which is transmitted through the pipe 35 to the chamber 116a, thereby causing valve member 121 to be opened to admit fluid to the intake manifold and to the pressure engine, where it is compressed and exhausted through the exhaust manifold 32 and through pipe 36.

The fluid, now being under pressure, causes piston 123 to be moved downward against spring 124, thereby admitting the fluid into the tank 40. As soon as the predetermined pressure is reached in the tank 40, said pressure is transmitted through the bleeder port 105 to pipe 104 to valve 100, thereby causing pressure diaphragm 113 to move to the left and cause driving clutch jaw 87 to be disengaged from clutch jaw 88.

When it is desired to start the internal combustion engine with which the starting mechanism is associated, the pilot or operator pulls the bell crank lever 39, thereby admitting fluid under pressure from the tank through the intake manifold 31 to the cylinders of the fluid pressure engine, thereby causing the reciprocation of pistons 15 and the rotation of the crank shaft of said engine. Rotation of the crank shaft is then transmitted through the reduction gearing by means of the pinion 58 to the driving barrel 67, and from the driving barrel through disc clutch 81 and the one-way roller clutch 77 to the driving member or shaft 73 and to the engine member 75, thereby cranking the latter to start the internal combustion engine.

As soon as the internal combustion engine is started and operating under its own power, engine member 75 drives shaft 73 at a much higher speed than when the latter was driving the engine member, thereby causing said shaft 73 to overrun the barrel 67, which causes one-way roller clutch 77 to disengage barrel 67 from the shaft thereby permitting free rotation of the latter in said barrel. Rotation of the shaft 73 is imparted to the barrel 96 through the disc clutch 97 to the driving clutch jaw 87, the latter idling until such time as the pressure within tank 40 drops, whereupon said clutch jaw is moved into engagement with clutch jaw 88 by means of spring 111 to cause the operation of the pressure engine as a compressor through the pinion 94, gear 95, and crank shaft of the pressure engine. When the desired pressure is reached within the tank 40, the operation of the pressure engine as a compressor is automatically stopped by the action of the valve 100 and the rod 109, which moves driving clutch jaw 87 out of engagement with clutch jaw 88.

It will be seen from the foregoing description that there is provided by the present invention a starter for internal combustion engines which is well suited for use particularly in aircraft, where it is desired to eliminate auxiliary apparatus as much as possible without sacrificing efficiency. The starter described includes as its power operating means, a compact and efficient fluid pressure motor or engine combined with reduction gearing and other drive transmission means for actuating a driving member which is in cranking engagement with a member of the engine to be started. There is also provided in combination with a starter and formed as an integral unit therewith, means whereby the power means may be operated as a generator of energy after the internal combustion engine is operating under its own power, thereby providing a reserve supply of energy for operating the starter mechanism.

It will be obvious that the invention is not limited to the form shown in the drawings, but is capable of a variety of mechanical embodiments. For example, any suitable type of distribution means may be substituted for the specific arrangement shown and described, and any suitable number of cylinders may be employed in the fluid pressure engine. Likewise, other forms of compact and symmetrical reduction gearing may be substituted for the gear train described herein. Also, various types of drive transmission means may be employed for operatively connecting the driving member to the crank shaft of the fluid pressure engine after the internal combustion engine is started, for operating said fluid pressure engine as a compressor, whereby a fluid may be compressed and stored in a supply tank.

It will also be understood by those skilled in the art that, broadly, the mechanical power means and devices associated therewith which have been illustrated and described may be replaced by other suitable power means and associated apparatus, for starting the internal combustion engine and for providing a reserve supply of energy by the operation of said engine after the latter is operating under its own power.

Various other changes, which will now appear to those skilled in the art, may be made in the form, details of construction, and arrangement of the parts, without departing from the scope of the invention, and reference is therefore to be had to the appended claims for a definition of the limits of the invention.

What is claimed is:

1. In starting mechanism of the class described, the combination of a shaft operatively connected with a member of the engine to be started and adapted to be driven by the engine after the latter is operating under its own power, a fluid pressure motor, a source of fluid under pressure for actuating said motor, transmission means including a limited torque clutch for operatively connecting said shaft with said fluid pressure motor during starting of the engine, a friction clutch operatively connected to said shaft, and a pair of clutch members, one of which is operatively connected with said friction clutch and the other of which is drivably connected with the fluid pressure motor, fluid pressure actuated means normally holding said clutch members out of engagement when the pressure at the source is above a predetermined value, and resilient means for urging one of said clutch members into engagement with the other upon a decrease in pressure below said predetermined value.

2. An engine starter comprising a unitary structure including a gear train and a shaft drivably connected to the engine to be started, means including a one way clutch drivably connecting said gear train with said shaft to start the engine, a friction clutch operatively connected to said shaft at a point thereon axially spaced from said one way clutch, a third clutch having an extension surrounding one end of said shaft and operatively connecting said friction clutch with said gear train, said extension and friction clutch being in concentric relation to each other, resilient means for urging said extension into operative engagement with said gear train to render said shaft and friction clutch effective to transmit power from the engine to said gear train, said resilient means being constituted by a spring, and fluid pressure actuated means for overcoming said spring and thus rendering said gear train ineffective to transmit power in the reverse direction either before or after the engine has started.

3. In starting mechanism of the class described, the combination of a shaft operatively connected with a member of the engine to be started and adapted to be driven by the engine after the latter is operating under its own power, a motor, means for actuating said motor, transmission means including a limited torque clutch for operatively connecting said shaft with said motor during starting of the engine, a friction clutch operatively connected to said shaft, a third clutch one member of which has an extension which is operatively connected with said friction clutch and the other member of which is drivably connected with the motor, fluid pressure actuated means normally holding said clutch members out of engagement when the actuating pressure is above a predetermined value, and resilient means for urging said clutch members into engagement upon a decrease in pressure below said predetermined value.

4. In starting mechanism of the class described, the combination of a shaft operatively connected with a member of the engine to be started and adapted to be driven by the engine after the latter is operating under its own power, a motor, means for actuating said motor, transmission means including a limited torque clutch for operatively connecting said shaft with said motor during starting of the engine, a friction clutch operatively connected to said shaft, a pair of clutch members, one of which is operatively connected with said friction clutch and the other of which is drivably connected with the motor, means normally holding said clutch members out of engagement, and resilient means for urging one of said clutch members into engagement with the other.

ROMEO M. NARDONE.